US011263131B2

(12) United States Patent
Li et al.

(10) Patent No.: US 11,263,131 B2
(45) Date of Patent: Mar. 1, 2022

(54) SYSTEM AND METHOD FOR ALLOCATING MEMORY SPACE

(71) Applicant: ALIBABA GROUP HOLDING LIMITED, Grand Cayman (KY)

(72) Inventors: Shuangchen Li, San Mateo, CA (US); Dimin Niu, San Mateo, CA (US); Fei Sun, San Mateo, CA (US); Jingjun Chu, San Mateo, CA (US); Hongzhong Zheng, San Mateo, CA (US); Guoyang Chen, San Mateo, CA (US); Yingmin Li, San Mateo, CA (US); Weifeng Zhang, San Mateo, CA (US); Xipeng Shen, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 28 days.

(21) Appl. No.: 16/843,293

(22) Filed: Apr. 8, 2020

(65) Prior Publication Data
US 2021/0318955 A1 Oct. 14, 2021

(51) Int. Cl.
*G06F 12/06* (2006.01)
*G06F 12/10* (2016.01)

(52) U.S. Cl.
CPC .......... *G06F 12/0646* (2013.01); *G06F 12/10* (2013.01); *G06F 2212/1008* (2013.01)

(58) Field of Classification Search
None
See application file for complete search history.

(56) References Cited

U.S. PATENT DOCUMENTS

| 5,604,864 A * | 2/1997 | Noda | G06F 12/145 711/100 |
| 9,448,929 B1 * | 9/2016 | Payer | G06F 12/023 |
| 2013/0246768 A1 * | 9/2013 | Gschwind | G06F 9/3016 712/227 |
| 2014/0130023 A1 * | 5/2014 | Chen | G06F 8/41 717/140 |
| 2015/0269073 A1 * | 9/2015 | O'Brien | G06F 12/06 711/203 |
| 2019/0236023 A1 * | 8/2019 | Leidel | G06F 9/445 |

* cited by examiner

*Primary Examiner* — Tracy C Chan
(74) *Attorney, Agent, or Firm* — Finnegan, Henderson, Farabow, Garrett & Dunner, LLP

(57) ABSTRACT

Embodiments of the disclosure provide systems and methods for allocating memory space in a memory device. The system can include: a memory device for providing the memory space; and a compiler component configured for: receiving a request for allocating a data array having a plurality of data elements in the memory device, wherein each of the plurality of data elements has a logical address; generating an instruction for allocating memory space for the data array in the memory device based on the request; generating device addresses for the plurality of data elements in the memory device based on logical addresses of the plurality of data elements; and allocating the memory space for the data array in the memory device based on the device addresses and the instruction.

26 Claims, 10 Drawing Sheets

SYSTEM AND METHOD FOR ALLOCATING MEMORY SPACE

BACKGROUND

A memory device (e.g., dynamic random-access memory (DRAM)) provides temporary storage space that can be accessed by an external device (e.g., a computer processor or an input/output (I/O) device). The accessing of the memory device can include writing or reading of the memory device. To access the memory device, a memory space for a data array has to be allocated in the memory device. During the allocation, logical addresses of data elements in the data array can be mapped to device addresses of the memory device.

Conventionally, the mapping relationship between the logical addresses and the device addresses is constructed within a memory controller of the memory device. And thus, the mapping relationship cannot be accessed by the compiler, not to mention being altered. Additionally, it requires a large search space within the memory device. As memory accesses to the memory device are made randomly, the large search space may further increases a miss ratio of missed accesses among all memory accesses.

SUMMARY

Embodiments of the disclosure provide a memory system for allocating memory space. The memory system can include: a memory device for providing the memory space; and a compiler component configured for: receiving a request for allocating a data array having a plurality of data elements in the memory device, wherein each of the plurality of data elements has a logical address; generating an instruction for allocating memory space for the data array in the memory device based on the request; generating device addresses for the plurality of data elements in the memory device based on logical addresses of the plurality of data elements; and allocating the memory space for the data array in the memory device based on the device addresses and the instruction.

Embodiments of the disclosure also provide a method for allocating memory space in a memory device. The method can include: receiving a request for allocating a data array having a plurality of data elements in the memory device, wherein each of the plurality of data elements has a logical address; generating an instruction for allocating memory space for the data array in the memory device based on the request; generating device addresses for the plurality of data elements in the memory device based on logical addresses of the plurality of data elements; and allocating the memory space for the data array in the memory device based on the device addresses and the instruction.

Embodiments of the disclosure also provide a memory system for allocating memory space. The memory system can include: a memory storing a set of instructions; and one or more processors configured to execute the set of instructions to cause the system to perform: receiving a request for allocating a data array having a plurality of data elements in the memory device, wherein each of the plurality of data elements has a logical address; generating an instruction for allocating memory space for the data array in the memory device based on the request; generating device addresses for the plurality of data elements in the memory device based on logical addresses of the plurality of data elements; and allocating the memory space for the data array in the memory device based on the device addresses and the instruction.

Embodiments of the disclosure further provide a processing-in-memory architecture. The processing-in-memory architecture can include: a first part storing a set of instructions; and a second part configured to execute the set of instructions to cause the architecture to perform: receiving a request for allocating a data array having a plurality of data elements in the memory device, wherein each of the plurality of data elements has a logical address; generating an instruction for allocating memory space for the data array in the memory device based on the request; generating device addresses for the plurality of data elements in the memory device based on logical addresses of the plurality of data elements; and allocating the memory space for the data array in the memory device based on the device addresses and the instruction.

Embodiments of the disclosure further provide a non-transitory computer readable medium that stores a set of instructions that is executable by one or more processors of a memory system to cause the memory system to perform a method for allocating memory space in a memory device of the memory system. The method can include: receiving a request for allocating a data array having a plurality of data elements in the memory device, wherein each of the plurality of data elements has a logical address; generating an instruction for allocating memory space for the data array in the memory device based on the request; generating device addresses for the plurality of data elements in the memory device based on logical addresses of the plurality of data elements; and allocating the memory space for the data array in the memory device based on the device addresses and the instruction.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of the present disclosure are illustrated in the following detailed description and the accompanying figures. Various features shown in the figures are not drawn to scale.

FIG. 2 illustrates a schematic diagram of an example of mapping data groups to memory banks, according some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims.

To address the above problems caused by the unalterable mapping relationship between the logical addresses and the device addresses and the increased miss ratio, embodiments of the present disclosure provide a method and a memory system for allocating memory space in a memory device. According to some embodiments of the present disclosure, a compiler of the memory system can compile a request for allocating memory space in a memory device into instructions, generate devices addresses for the memory space in the memory device, and send the instructions and the device addresses to the memory device for execution. As a result, the device addresses are accessible to the compiler and the compiler can adjust the device addresses and the instruction to optimize the performance of the memory device during the execution. For example, as the compiler can be aware of the device address, the search space and the miss ratio can be reduced during memory operations. Moreover, a tuner can be provided in the compiler and can evaluate performance metrics under a plurality of tuning parameter sets to determine the most optimal parameters for allocating memory space. The tuner can also assist the design of hardware by determine hardware configuration as part of the tuning parameters.

Figure 1:
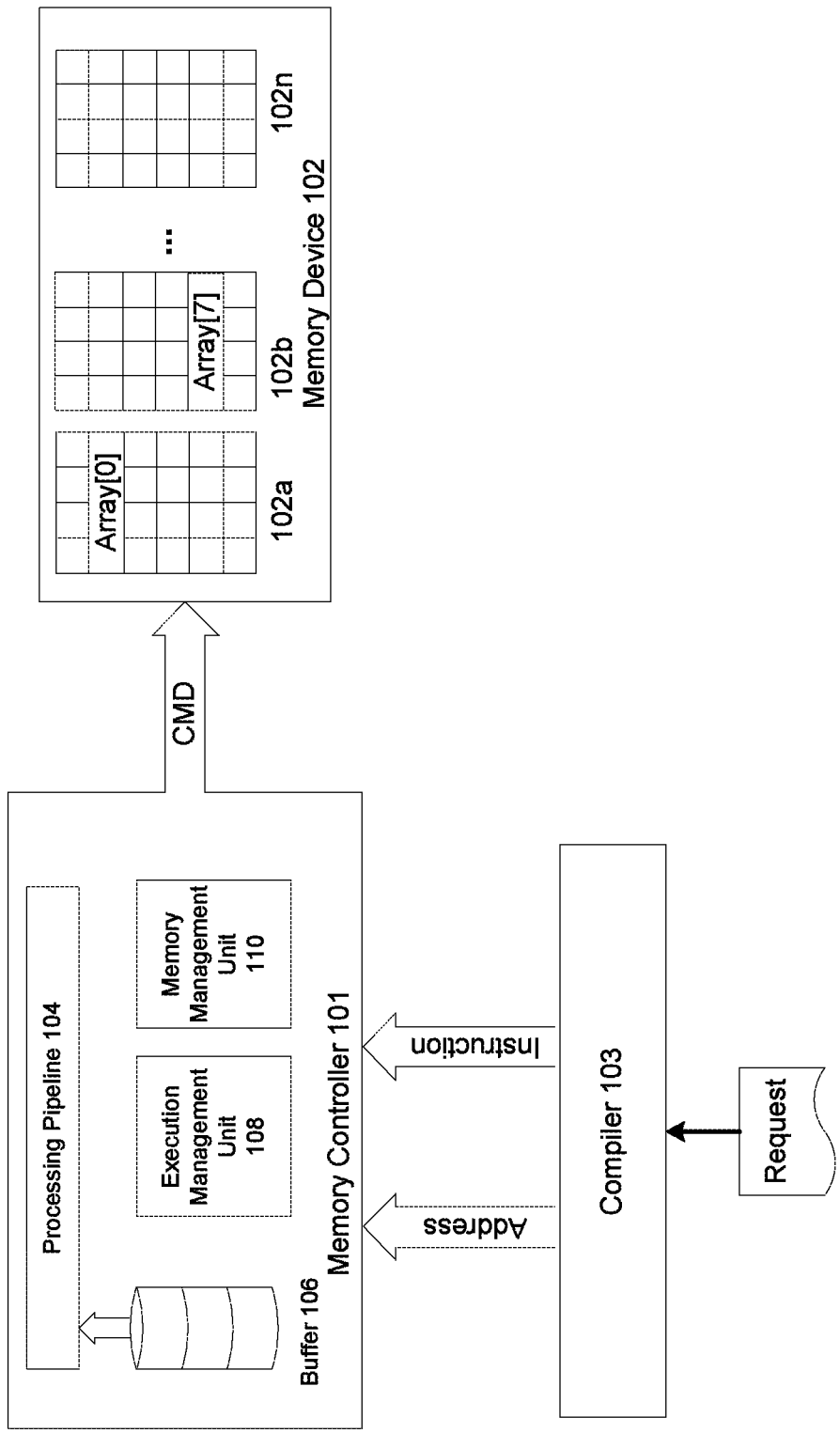
FIG. 1 illustrates an exemplary memory system, according to some embodiments of the disclosure.

FIG. 1 illustrates an exemplary memory system 100, according to some embodiments of the disclosure. As shown in FIG. 1, memory system 100 can include a memory controller 101 and a memory device 102 communicatively coupled with memory controller 101.

Memory controller 101 can be a computing processor for generating memory commands for the execution of memory device 102. In some embodiments, memory controller 101 can include a command scheduler for scheduling the memory commands under instructions received from a compiler.

Memory device 102 can be a DRAM device and can provide a memory space for storing data and instructions. The instructions can be a part of a computing program that accesses data stored in memory device 102. Memory device 102 can include a plurality of memory banks (e.g., banks 102a, 102b, . . . , and 102n), each having a plurality of rows for storing data. Each row of a memory bank can store one or more data elements, depending on a size of a data element.

Memory system 100 can further include a compiler 103. Compiler 103 can run on a processing unit. The processing unit can be an external processing unit (e.g., a host CPU) or a component of memory system 100. Compiler 103 can compile a computing program (e.g., a machine learning program) into a set of instructions, such as a "read" instruction, a "write" instruction, a "copy" instruction, an "allocate" instruction, and the like. It is appreciated that the "copy" instruction can include a "read" instruction and a "write" instruction, both of which can be associated with a request for allocating memory space in memory device 102. And the "allocate" instruction itself can be the request for allocating memory space in memory device 102. As an example, an instruction can be the "allocate" instruction (e.g., "malloc") for allocating a data array (e.g., array [ ]) in memory device 102. The allocated memory space can be used for reading or writing memory device 102. In reading memory device 102, the allocated memory space can be used to store the data being read from memory device 102 according to the "read" instruction. In writing memory device 102, the allocated memory space can be used to hold the data being written into memory device 102 according to the "write" instruction.

The generated instructions (e.g., the "write" instruction, the "copy" instruction, the "allocate" instruction) can be then processed by memory controller 101. Memory controller 101 can include a processing pipeline 104, an instruction buffer 106, an execution management unit 108, and a memory management unit (MMU) 110. Each of the units and buffers may include a set of combinational and sequential logic circuits constructed based on, for example, metal oxide semiconductor field effect transistors (MOSFET). Execution management unit 108 can control and manage the execution of instructions by processing pipeline 104. For example, after execution management unit 108 receives an indication (e.g., from an operating system) to execute the computing program including e.g., a request for allocating memory space, execution management unit 108 can create a computing process, which can provide an indication of the state of execution of the computing program by processing pipeline 104. After creating the computing process, execution management unit 108 can load the computing program from a secondary storage device (e.g., a hard disk drive) into memory device 102, and control instruction buffer 106 to acquire a set of instructions associated with the computing program from memory device 102.

The set of instructions can be stored and executed according to a sequential order reflected in the computing program. For example, as shown in FIG. 1, instruction buffer 106 includes a buffer head pointer and a buffer tail pointer. Under the control of execution management unit 108, instruction buffer 106 may fetch an instruction stored at a buffer location associated with the buffer head pointer to processing pipeline 104 for execution. Processing pipeline 104, when executing the instruction, can access memory device 102 to transmit or receive data according to the instruction. After fetching the instruction, instruction buffer 106 can remove the instruction from the buffer and move buffer head pointer to the next buffer location to fetch the next instruction for execution.

Execution management unit 108 can control the fetching of instructions by instruction buffer 106 based on various criteria. For example, execution management unit 108 may determine whether an instruction causes an exception. An exception may occur when the execution of the instruction can lead to anomalous or exceptional operating conditions for the computer processor. As an illustrative example, the "allocate" instruction of the computing program may cause memory controller 101 to access a memory location within memory device 102 that does not exist, or a memory location that memory controller 101 has no access permission.

MMU 110 allocates and manages memory spaces for different computing processes. After execution management unit 108 creates a computing process for the execution of the computing program, MMU 110 can assign a set of device memory locations in memory device 102, with each memory location being associated with a device address. MMU 110 can also create a virtual memory space and provide the virtual memory space to the computing process as an alias to the set of physical memory locations. The virtual memory space can include a set of pages, each of which can include a set of contagious virtual memory locations. Each virtual memory location can be associated with a virtual memory address and can be mapped to a device memory location assigned by MMU 110. A page typically includes 4096 bytes of memory space. Generally, a data array can include a plurality of data elements, such as array[0], array[1], array [2], . . . , and array[8]. It is appreciated that the data array can be one row of data or a matrix of data. In other words, a data element can include one bit of data or a row of data. Each of the plurality of data elements can have a logical address. The logical address is the address at which a data element appears to reside from the perspective of the computing program being executed. For example, the logical address can include a segment address and an offset. More particularly, the logical address of, for example, array[8] can include a segment address of array[ ] and an offset of "8."

In addition to managing instructions at the end of memory controller 101, compiler 103 can also process the generated instructions before sending them to memory controller 101.

In some embodiments, compiler 103 can perform special processing (e.g., changing the normal flow of the execution of the computing program, inserting another instruction into a queue of instructions, etc.) on the instructions. For example, compiler 103 can determine to change the flow of execution of the instructions (e.g., skipping the "allocate" instruction, terminating the execution of the computing program, etc.). More particularly, compiler 103 can also reorder the execution of an instruction, if the instruction has data dependency on certain computing resources. The subsequent instruction can be ordered to a position of an execution order where the computing resources are available. For example, an instruction of "$R3=dst[5]+1" requires data stored in the memory location labelled "dst," and the data is also modified by a previous "copy" instruction. Based on a determination of such data dependency, compiler 103 can withhold the execution of the instruction of "$R3=dst[5]+1" until the execution of the previous "copy" instruction completes, while another instruction having no data dependency can be inserted into the execution order before the instruction of "$R3=dst[5]+1." The scheduling of instructions can be determined based on the computing resources, the bank conflicts of memory device 102, and the like.

Other than the generation of instructions, compiler 103 can also generate device addresses for the plurality of data elements in memory device 102 based on the logical addresses. A device address can reflect the actual address of a data element located in memory device 102. For example, referring to FIG. 1, the device addresses of array[0] and array[7] can reflect that array[0] is stored at the second row of bank 102a and array[7] is stored at the fifth row of bank 102b. Though the second row of bank 102a and the fifth row of bank 102b are illustrates to only have array[0] and array[7], the second row of bank 102a and the fifth row of bank 102b may hold other data elements. It is appreciated that elements having continuous logical addresses may be allocated to non-continuous device addresses. Because the allocation of data elements in memory device 102 can affect the access speed of these data elements, the latency of memory device 102 can be improved by improving the mapping of logical addresses to device addresses.

To generate device addresses, compiler 103 can generate physical addresses of the plurality of data elements based on the logical addresses, and then generate the device addresses based on the physical addresses. In some embodiments, a physical address of a data element has a linear mapping relationship with its corresponding logical address. Thus, the physical address of the data element can be generated by a look-up table, which stores mappings between the logical addresses and the physical addresses.

Continuous logical addresses may not be accessed continuously during execution of the computing program. For example, the computing program may access array[ ] in an order of array[4], array[0], array[5], array[8], array[2], array [3], array[6], array[1], and array[7] during the execution of the computing program. The order {4, 0, 5, 8, 2, 3, 6, 1, 7} of these data elements being accessed during execution can be referred to as an access trace.

To determine the access trace, the request of allocating memory space for array[ ] can be transformed to one or more loops associated with the plurality of data elements first. For example, a request for accessing a data matrix of 10×10 data elements can be transformed into 25 loops each iterating 4 times in two layers. Therefore, each loop can access a block of 2×2 data elements. Then, a loop trace of the one or more loops can be determined. For example, compiler 103 can determine that a first loop accesses a first block of 2×2 data elements, a second loop accesses a second block of 2×2 data elements, and so on. The access information of the one or more loops can be combined to form the loop trace. Thus, the loop trace can reflect an order of the data elements to be accessed on a basis of loops. Accordingly, the access trace of the logical addresses of the plurality of data elements can be determined based on the loop trace.

By allocating data elements being accessed continuously in a same memory bank with continuous device addresses, latency and the miss ratio of memory device 102 can be improved. Thus, compiler 103 can determine an access trace of the logical addresses of the plurality of data elements based on the computing program and group the plurality of data elements into a plurality of data groups. The access trace can reflect an order of data elements to be accessed continuously during execution of the computing program.

Figure 2:
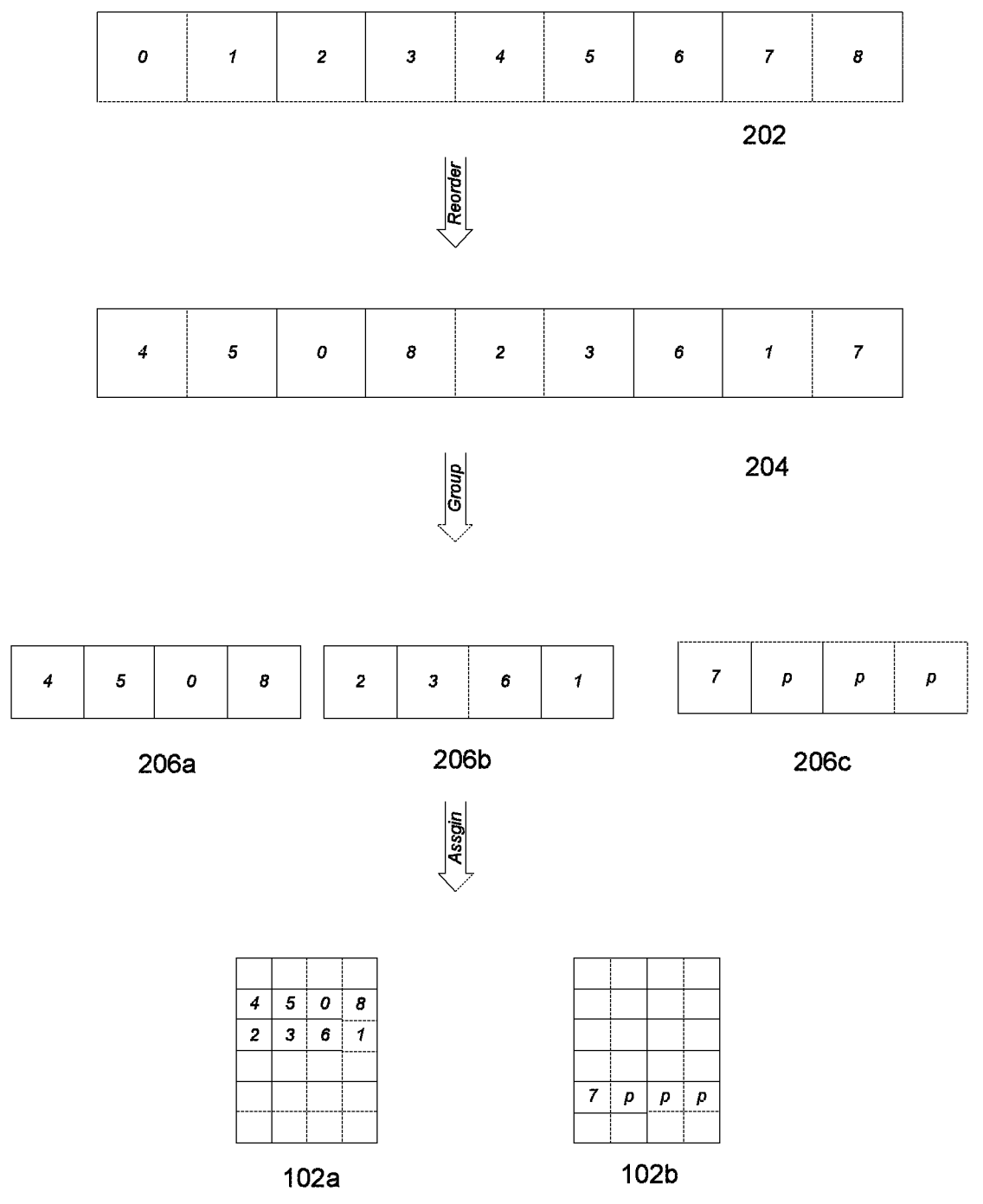

FIG. 2 illustrates a schematic diagram of respectively mapping data groups to memory banks, according some embodiments of the disclosure.

As shown in FIG. 2, a data array 202 having data elements of array[0], array[1], array[2], . . . , and array[8] in an order of {0, 1, 2, 3, 4, 5, 6, 7, 8} can be reordered into a reordered data array 204 in an order of {4, 5, 0, 8, 2, 3, 6, 1, 7} according to, for example, the access trace of logical addresses of the data elements. It is appreciated that an array element (e.g., array[0]) of data array 202 can also be an array. In that case, data array 202 can be a data matrix.

Then, reordered data array 204 can be grouped into a plurality of data groups (e.g., three groups 206a, 206b, and 206c). In some embodiments, a length of a data group can be determined based on a length of a row of a bank in memory device 102. For example, the length of a data group can be equal to the length of a row of a bank in memory device 102. Therefore, as shown in FIG. 2, each of data groups 206a and 206b has a length of four data elements, which is also the length of a row of a memory bank. It is appreciated that a remainder (e.g., array[7]) of a grouped data array can be padded to form a data group to meet the requirement of length. For example, data group 206c only has one data element and is padded with three null elements to meet the four-element length requirement.

The plurality of data groups (e.g., data groups 206a, 206b, and 206c) can be further mapped to available rows of memory banks 102a and 102b of memory device 102, and device addresses of the available rows can be determined as the device addresses for the plurality of data elements in memory device 102. In mapping the plurality of data groups, some embodiments of the disclosure provide a method for packing data groups in the available rows and a method for distributing data groups in the available rows. In some embodiments, data array 202 and the plurality of data groups can be associated with a variable for indicating a method for mapping the plurality of data groups. It is appreciated that data array 202 and the plurality of data groups can also be associated with other one or more variables. For example, data array 202 and the plurality of data groups can also be associated with another parameter for indicating a position of data array 202 among a plurality of data arrays to be processed.

Figure 3A:
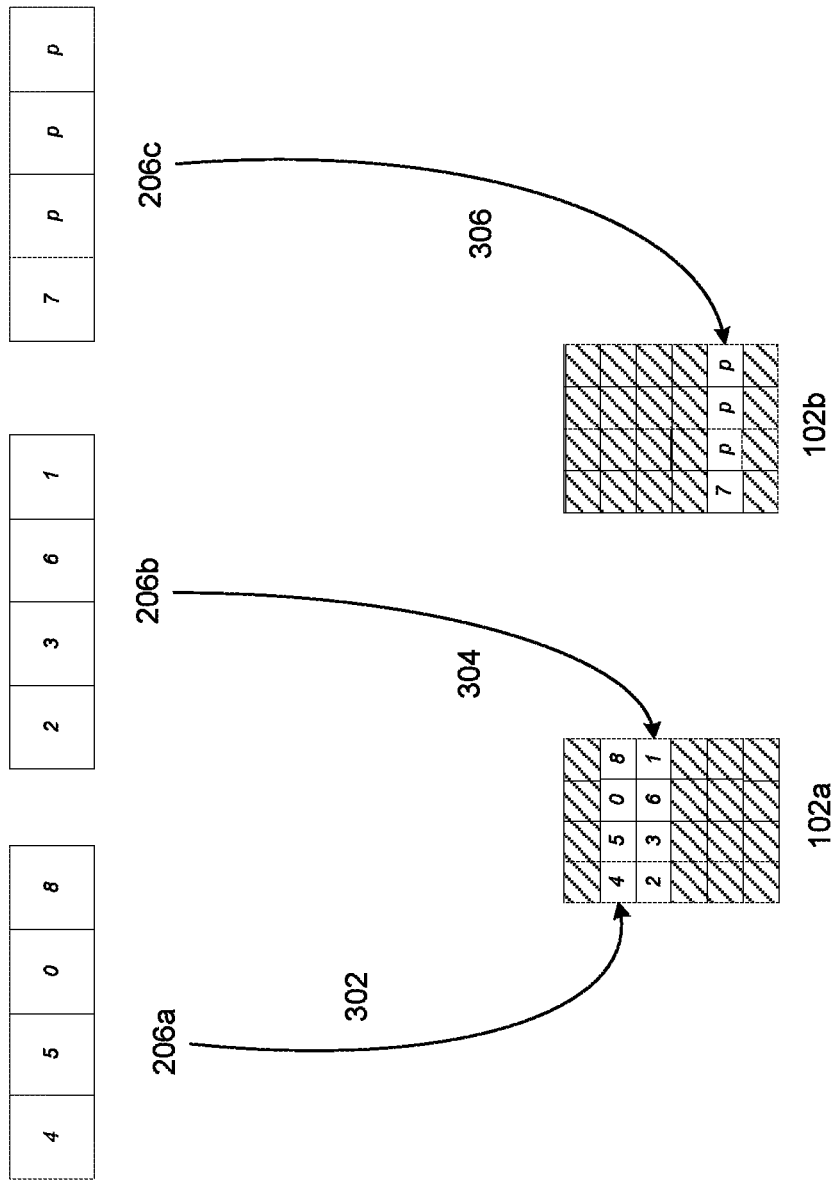
FIG. 3A illustrates a schematic diagram of an example of packing data groups in available rows, according to some embodiments of the disclosure.

FIG. 3A illustrates a schematic diagram of packing data groups in available rows, according to some embodiments of the disclosure. Compiler 103 can pack data groups in available rows when the variable for indicating a method for mapping the plurality of data groups meets a given condition. For example, when the variable is equal to "0," compiler 103 can be notified to pack data groups in available rows of memory banks.

It is appreciated that some rows of memory banks of a memory device may have been occupied before packing. Therefore, in packing data groups, compiler 103 can determine available space of memory banks (e.g., memory banks 102a and 102b) of memory device 102, which can be measured by a number of available rows in each memory bank. The available space can also be referred to as spaciousness. In FIG. 3A, used rows of memory banks are indicated by slashed blocks. Then, compiler 103 can sort the memory banks of memory device 102 based on a descending order of the available space of the memory banks for receiving data groups. For example, as shown in FIG. 3A, bank 102a has two available rows, starting from the second row, and bank 102b has one available row (i.e., the fifth row). Therefore, based on the available space of memory banks 102a and 102b, the descending order for receiving data groups 206a-206c can be determined.

Then, compiler 103 can sequentially pack the plurality of data groups 206a-206c to the available rows of memory banks 102a and 102b according to the descending order. For example, as shown in FIG. 3A, at 302, data group 206a can be mapped to a first available row in a most spacious memory bank, which is the second row of bank 102a in FIG. 3A. Data group 206b can be sequentially mapped to a next available row (e.g., the third row of bank 102a in FIG. 3A) at 304. After available rows of the most spacious memory bank 102a are completely filled with data groups, a data group can be further mapped to an available row of a second most spacious memory bank 102b. For example, data group 206c can be mapped to the fifth row of bank 102b at 306.

Thus, the continuousness of data elements can be ensured to a maximum extent, when the data elements are being accessed.

Figure 3B:
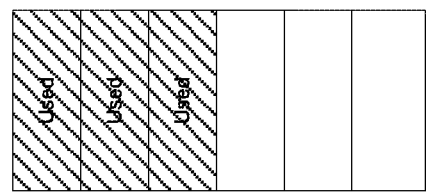
FIG. 3B illustrates a schematic diagram of an example of distributing data groups in available rows, according to some embodiments of the disclosure.
Figure 3B:
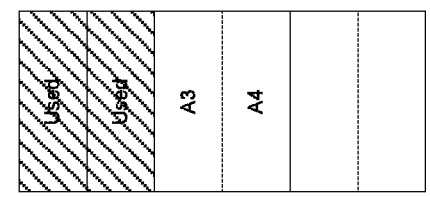
Figure 3B:
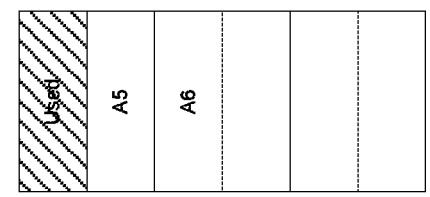
Figure 3B:
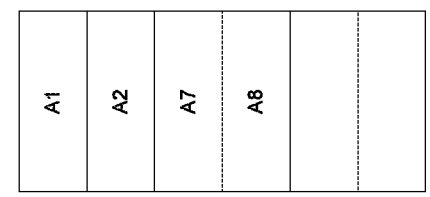

FIG. 3B illustrates a schematic diagram of distributing data groups in available rows, according to some embodiments of the disclosure. Compiler 103 can distribute data groups in available rows when the variable for indicating a method for mapping the plurality of data groups meets another given condition. For example, when the variable is equal to "1," compiler 103 can be notified to distribute data groups in available rows of memory banks.

In FIG. 3B, as an example, eight data groups A1-A8 are to be mapped to available rows of memory banks. In distributing data groups, compiler 103 can also determine available space of memory banks (e.g., memory banks 102a and 102b) of memory device 102. As shown in FIG. 3B, bank 312 has six available rows, bank 314 has five available rows, bank 316 has four available rows, and bank 318 has three available rows.

Compiler 103 can select a number K of memory banks having the largest available space. For example, compiler 103 can select three banks (e.g., K=3) having the largest available space to receive data groups. In FIG. 3B, the three banks having the largest available space include banks 312, 314, and 316, which are boxed by a dashed line. Thus, data groups can only be distributed across the selected memory banks.

Then, compiler 103 can distribute the plurality of data groups to the number of memory banks according to a bank stride V and a data stride U in an interleaving manner. The data stride U can reflect how many data groups a compiler can distribute each time, and the bank stride V can reflect a stride between a first bank and a second bank to be mapped with data groups. For example, both the data stride and the bank stride in FIG. 3B can be set to two. Therefore, the first two data groups (i.e., A1 and A2) can be mapped to the most spacious bank (i.e., bank 312), and the second two data groups (i.e., A3 and A4) can be mapped to a bank that is one bank stride (i.e., two banks) away from bank 312. Therefore, A3 and A4 can be mapped to bank 316, as shown in FIG. 3B. Similarly, the third two data groups (i.e., A5 and A6) can be mapped to a bank that is one bank stride away from bank 316. It is appreciated that the bank that is one bank stride away from bank 316 is bank 314 as the distribution is only performed within the selected three banks. Thus, A5 and A6 can be mapped to bank 314. And A7 and A8 can be mapped to bank 312 accordingly.

By interleaving data group among memory banks, the accessing of data can avoid bank conflict, which can improve the latency of the memory system.

Therefore, the plurality of data groups can be mapped to available rows in memory banks according to the value of the variable. It is appreciated that the variable may have more values than "0" and "1," and the plurality of data groups can be mapped to available rows in memory banks according to methods other than packing and distributing as described above.

After the plurality of data groups are mapped to rows of memory banks, compiler 103 can determine devices addresses of the available rows as the devices addresses for the plurality of data elements that consist the data groups.

Then, with reference back to FIG. 1, compiler 103 can send the device addresses and instructions (e.g., the "allocate" instruction) to memory controller 101. Accordingly, memory controller 101 can execute the instructions and allocate memory space for the data array (e.g., data array 202 of FIG. 2) in memory device 102 based on the device addresses and the instructions.

Figure 4:
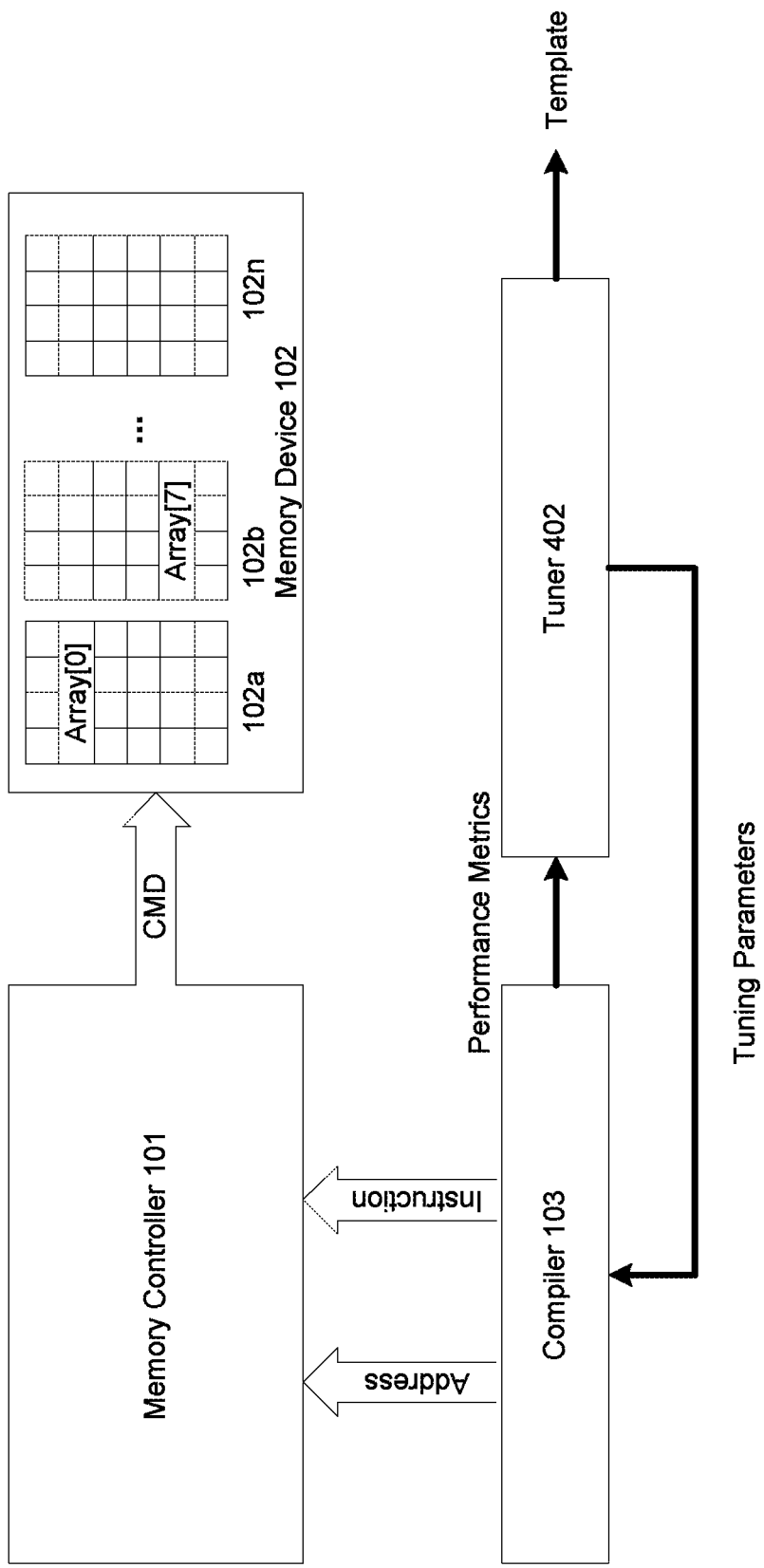
FIG. 4 illustrates another exemplary memory system, according to some embodiments of the disclosure.

FIG. 4 illustrates another exemplary memory system 400, according to some embodiments of the disclosure.

Compared to memory system 100 of FIG. 1, memory system 400 further includes a tuner 402, configured to determine tuning parameters for compiling a computing program. Tuner 402 can be an independent program/component executed on a processing unit (e.g., a host CPU) or part of compiler 103. For the purpose of illustration, tuner 402 is shown to be independent from compiler 103 in FIG. 4.

Tuner 402 can provide one or more tuning parameter sets to compiler 103. Each of the one or more tuning parameter sets can have a plurality of tuning parameters. For example, the plurality of tuning parameters can include at least one variable associated with a data array (e.g., data array 202), a number K of memory banks selected to be distributed with data groups, a bank stride V, and a data stride U. More particularly, the at least one variable associated with data array 202 can include a variable for indicating a method for mapping the data groups (e.g., packing, distributing, or the like). It is appreciated that, each tuning parameter set can include more parameters, such as parameters related to transforming of the request for allocating memory space (also known as partitioning/tiling of loops), parameters related to scheduling of instructions, a hardware configuration, a memory trace, and the like. Among other things, the hardware configuration can be used to generate architecture specification language for simulation/emulation.

Compiler 103 can then perform the above-described process to simulate the allocation of memory space in memory device 102 (such as transforming the request for allocating memory space, generating the loop trace, determining a logical address trace, mapping the logical address, generating the device addresses), and acquire performance metrics from the simulation. It is appreciated that the performance metrics of real hardware can be measured, rather than being generated by simulation. Based on the performance metrics returned by compiler 103, tuner 402 can then evaluate performance of memory device 102 under each of the plurality of tuning parameter sets. For example, the performance metrics of each tuning parameter set can be compared to determine a tuning parameter set that suits data array 202.

Accordingly, tuner 402 can determine, among the one or more tuning parameter sets, a tuning parameter set for allocating memory space in memory device 102 based on the evaluation. In some embodiments, the determined tuning parameter set for allocating memory space in memory device 102 can be sent back to compiler 103, so that compiler 103 can actually allocate memory space in memory device 102 according to the determined tuning parameter set. In some embodiments, a template for allocating memory space can be further generated based on the determined tuning parameter set, as shown in FIG. 4. For example, the template can be integrated into compiler 103, and compiler 103 can allocate memory space according to the template without running tuner 402 again.

As described above, the hardware configuration is also part of the tuning parameter set. The hardware configuration can include, for example, a clock frequency, a bandwidth of a data bus, a number of memory banks attached to the data bus, and the like. In some embodiments, the determined hardware configuration can be used to implement a memory system (e.g., memory system 100 of FIG. 1).

Thus, tuner 402 can improve not only the allocation of memory space, but also the design of the memory system.

Figure 5:
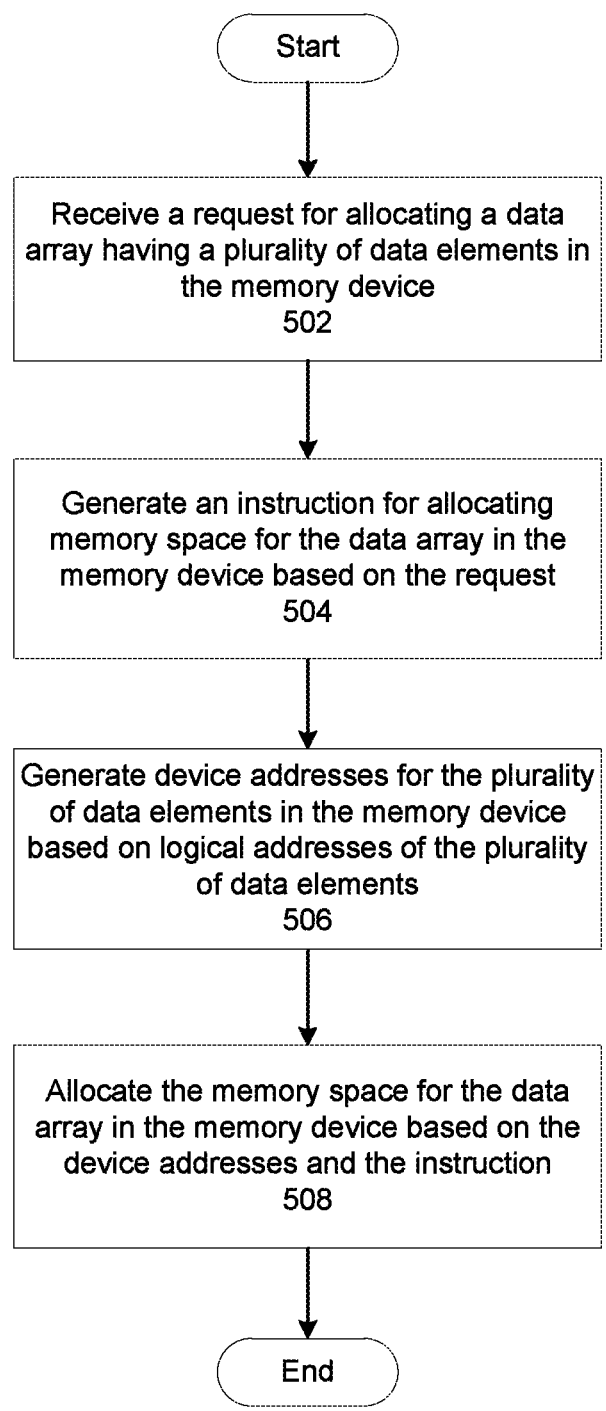
FIG. 5 illustrates an exemplary method for allocating memory space in a memory device, according to some embodiments of the disclosure.

FIG. 5 illustrates a method 500 for allocating memory space in a memory device, according to some embodiments of the disclosure. Method 500 can be executed by, for example, a compiler for the memory device. The compiler (e.g., compiler 103) can run on a processor of a memory system, which includes the memory device. Method 500 can include steps as follows.

At step 502, the compiler can receive a request for allocating a data array having a plurality of data elements in the memory device (e.g., memory device 102). Each of the plurality of data elements can have a logical address.

At step 504, the compiler can generate an instruction for allocating memory space for the data array in the memory device based on the request. It is appreciated that, as the request for allocating memory space may be merely part of a computing program, the generated instruction can be one of a plurality of instructions. The compiler can also perform special processing (e.g., changing the normal flow of the execution of the computing program, inserting another instruction into a queue of instructions, etc.) on the instructions to improve the performance of the memory device during execution.

At step 506, the compiler can generate device addresses for the plurality of data elements in the memory device based on logical addresses of the plurality of data elements.

In some embodiments, an access trace of the logical addresses of the plurality of data elements can be determined based on the request. Based on the request, the compiler can determine a sequence of accessing the plurality of data elements, and thus, can determine the access trace of the corresponding logical addresses. For example, the compiler can transform the request to one or more loops associated with the plurality of data elements. Each of the one or more loops can sequentially access a block of data elements in the data array. Then, the compiler can determine a loop trace of the one or more loops, e.g., based on the sequence of these blocks being accessed. The access trace of the logical addresses of the plurality of data elements can be determined based on the loop trace.

In some embodiments, physical addresses of the plurality of data elements can be generated based on the logical addresses, and the device addresses for the plurality of data elements in the memory device can be further generated based on the physical addresses.

Then, the compiler can group the plurality of data elements into a plurality of data groups based on the access trace. A length of each data group can be equal to a length of a row of the memory device, so that data elements of each data group can be hosted by rows of the memory device. To improve efficiency of accessing the memory device, data elements of each group have continuous logical addresses according to the access trace. The plurality of data groups can be reordered according to the access trace, so that the reordered data groups of the data array are consistent with the access trace. The data array can further be associated with a variable related to mapping the plurality of data groups.

The plurality of data groups can be mapped to available rows of memory banks of the memory device, and device addresses of the available rows can be determined as the device addresses for the plurality of data elements in the memory device. Exemplary methods for mapping data groups to available rows are described with reference to FIG. 6A-6B.

Figure 6A:
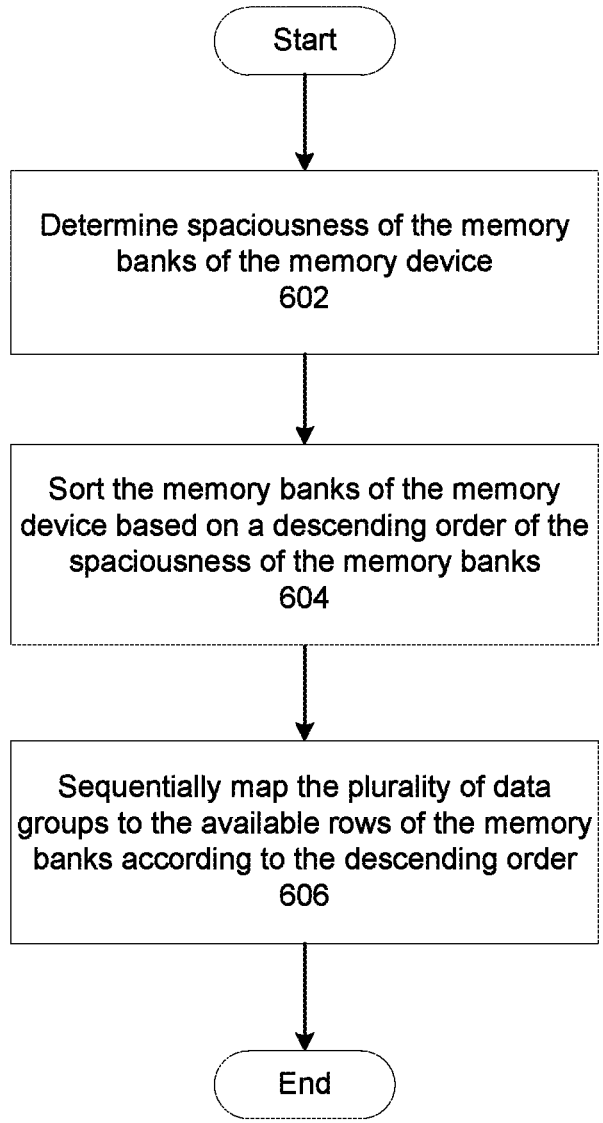
FIG. 6A illustrates a flowchart of an exemplary method for packing data groups to available rows of memory banks of a memory device, according to some embodiments of the disclosure.

FIG. 6A illustrates a flowchart of an exemplary method 600 for packing data groups to available rows of memory banks of a memory device, according to some embodiments of the disclosure. Method 600 can be implemented independently or as part of method 500. Method 600 can be selected for mapping data groups when the variable meets a first condition. For example, the first condition can include the variable being "0." Method 600 can include steps as follows.

At step 602, available space of the memory banks of the memory device can be determined. The available space can indicate how many available rows a memory bank has.

At step 604, the memory banks of the memory device can be sorted based on a descending order of the available space of the memory banks. For example, a memory bank having the most available rows can be a first memory bank according to the descending order, a memory bank having the second most available rows can be a second memory bank according to the descending order, and so on.

At step 606, the plurality of data groups can be sequentially mapped to the available rows of the memory banks according to the descending order. For example, the plurality of data groups can be mapped to the first memory bank first. And after available rows of the first memory bank are filled with data groups, the rest of the plurality of data groups can be mapped to available rows of the second memory bank. Detailed description has been made with reference to FIG. 3A, and thus is omitted herein.

Figure 6B:
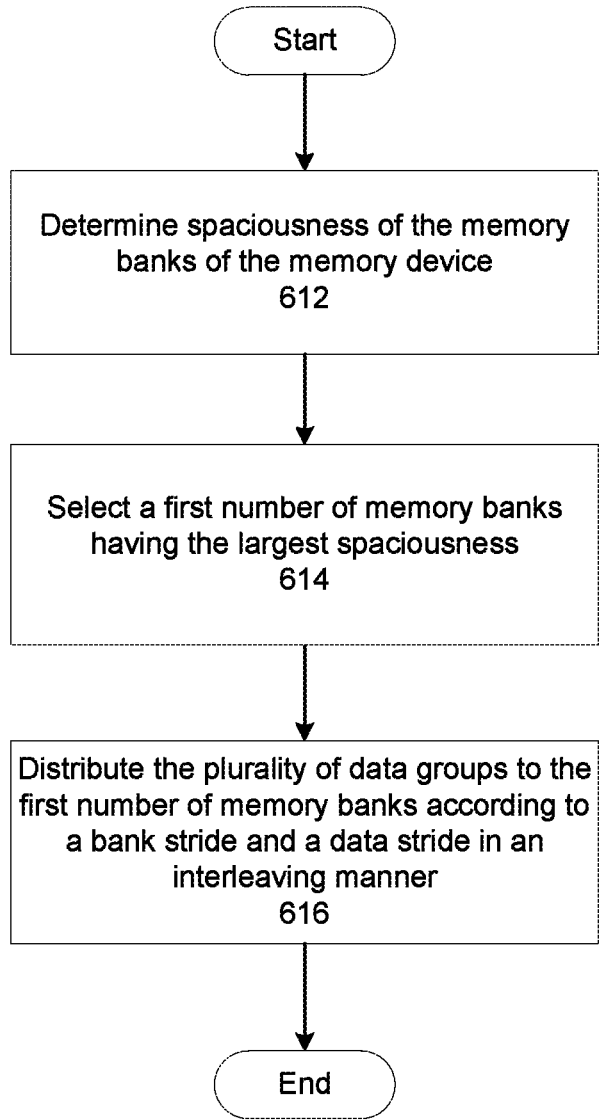
FIG. 6B illustrates a flowchart of an exemplary method for distributing data groups to available rows of memory banks of a memory device, according to some embodiments of the disclosure.

FIG. 6B illustrates a flowchart of an exemplary method 610 for distributing data groups to available rows of memory banks of a memory device, according to some embodiments of the disclosure. Method 610 can be implemented independently or as part of method 500. Method 610 can be selected for mapping data groups when the variable meets a second condition. For example, the second condition can include the variable being "1." Method 610 can include the following steps.

At step 612, similarly, available space of the memory banks of the memory device can be determined.

At step 614, a first number of memory banks having the largest available space can be selected. The selected first number of memory banks can be used to host the plurality of data groups. That is, no data groups can be mapped to any memory banks other than the selected first number of memory banks. For example, if the first number is equal to three, three memory banks having the largest available space can be selected.

At step 616, the plurality of data groups can be distributed to the first number of memory banks according to a bank stride and a data stride in an interleaving manner. The data stride can reflect how many data groups can be distributed each time, and the bank stride can reflect a stride between a first bank and a second bank to be mapped with data groups. In some embodiments, the bank stride can be equal to a second number and the data stride can be equal to a third number, and a first batch having the third number of data groups can be distributed to a first memory bank having the largest available space among the first number of memory banks. Then, among the first number of memory banks, a second memory bank can be determined based on the first number and the second number, and a second batch having another third number of data groups can be distributed to the second memory bank. It is appreciated the second batch is neighboring to the first batch in the plurality of data groups, as the plurality of data groups are generated based on the access trace. Detailed description has been made with reference to FIG. 3B, and thus is omitted herein.

It is appreciated that, though data groups are mapped to available rows of memory banks, the data groups are not allocated to these rows yet. However, with the data groups being mapped to available rows of memory banks, device addresses of the available rows can be determined as the device addresses for the plurality of data elements in the memory device.

Referring back to FIG. 5, at step 508, the compiler can allocate the memory space for the data array in the memory device based on the device addresses and the instruction.

Figure 7:
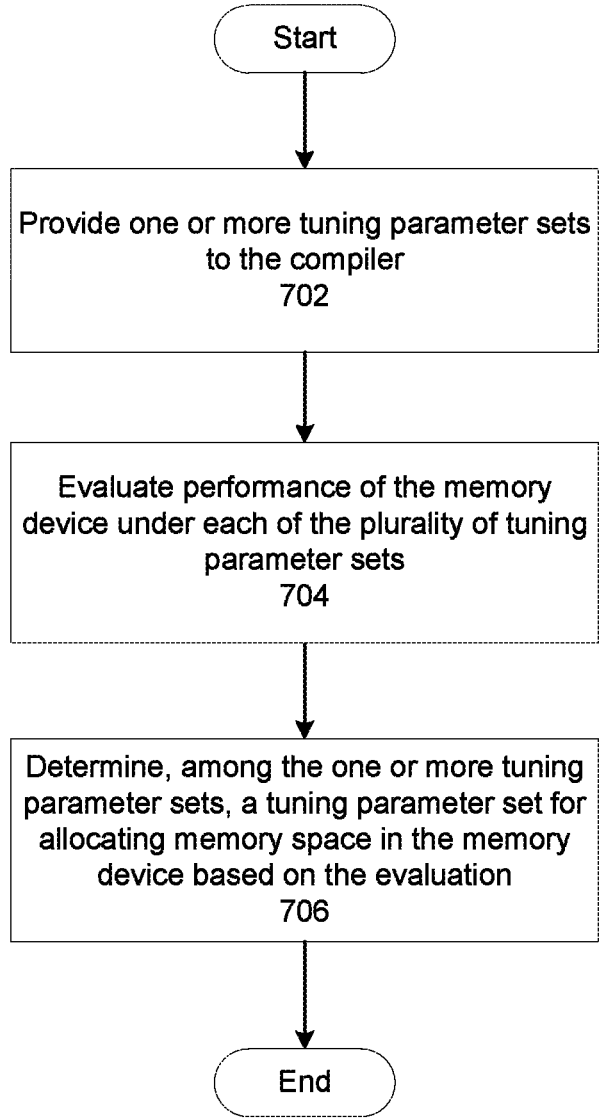
FIG. 7 illustrate a flowchart of an exemplary method for tuning parameters for allocating memory space in a memory device, according to some embodiments of the disclosure.

FIG. 7 illustrates a flowchart of an exemplary method 700 for tuning parameters for allocating memory space in a memory device, according to some embodiments of the disclosure. Method 700 can be implemented as part of method 500 or implemented independently. Method 700 can include the following steps.

At step 702, one or more tuning parameter sets can be provided to the compiler. Each of the one or more tuning parameter sets can have a plurality of tuning parameters. For example, the plurality of tuning parameters can include the variable related to mapping the plurality of data groups, the first number, the bank stride, and the data stride. In some embodiments, the plurality of tuning parameters can also include another parameter for indicating a position of the data array among a plurality of data arrays to be processed. In some embodiments, the plurality of tuning parameters can further include parameters related to transforming of the request for allocating memory space (also known as partitioning/tiling of loops), parameters related to scheduling of instructions, a hardware configuration, and the like. Among other things, the hardware configuration can be used to generate architecture specification language for simulation/emulation.

At step 704, performance of the memory device can be evaluated under each of the plurality of tuning parameter sets. For example, performance metrics can be generated and evaluated for each of the plurality of tuning parameter sets.

At step 706, among the one or more tuning parameter sets, a tuning parameter set for allocating memory space in the memory device can be determined based on the evaluation. The tuning parameter set that can provide the best performance can be determined. It is appreciated that the determined tuning parameter set can be immediately used for allocating memory space or integrated in the compiler for future use. For example, when a computing program is being compiled, the compiler can allocate memory space according to the determined tuning parameter set. In addition to the allocation of the memory space, the compiler can also reorder instructions generated by compiling the computing program according to the determined tuning parameter set.

Figure 8:
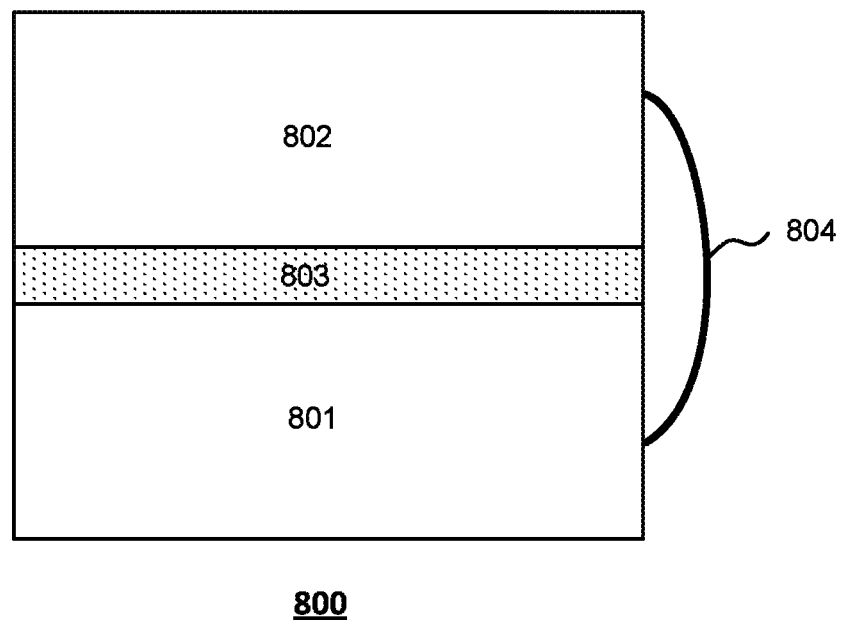
FIG. 8 illustrates a schematic diagram of an exemplary PIM architecture, according to some embodiments of the disclosure.

Embodiments of the disclosure further provide a memory system for allocating memory space. The memory system (e.g., memory system 100 or 400) can be incorporated in a processing-in-memory (PIM) device and include a memory for storing a set of instructions and one or more processors configured to execute the set of instructions to cause the system to perform methods 500, 600, 610, or 700 of FIGS. 5-7. FIG. 8 illustrates a schematic diagram of an exemplary PIM architecture 800, according to some embodiments of the disclosure.

As shown in FIG. 8, PIM architecture 800 can include a first part 801, a second part 802, and a wire bonding 804 communicatively connecting first part 801 with second part 802. First part 801 can include one or more dies stacked together. Second part 802 can be integrated on a surface of first part 801, and include at least two dies stacked together. In some embodiments, two or more dies of first part 801 or two or more dies of second part 802 can be coupled or connected by various technologies, such as face-to-face integration, back-to-face integration, TSVs, contacts, metal layer, network on chip (NoC), or the like. The die in first part 801 or second part 802 can be any type of dies, including, but not limited to, logic die, memory die, storage die, PIM die, or the like. Additionally, the die in first part 801 or second part 802 can be any two-dimensional (2D) die, e.g., 2D logic die, 2D memory die, 2D storage die, 2D PIM die, or the like, or any three-dimensional (3D) die that is manufactured using a die stacking technology, e.g., 3D silicon in chip (SiC), monolithic 3D ICs, or the like.

In some embodiments, first part 801 can function as a memory for storing a set of instructions, and second part 802 can function as a processor for executing the set of instructions to cause architecture 800 to perform methods 500, 600, 610, or 700 of FIGS. 5-7.

As shown in FIG. 8, first part 801 and second part 802 can be connected by wire bonding 804 that can communicate data and instructions between first part 801 and second part 802. Wire bonding 804 can include one or more wire connections in various topologies, such as single connection topology, bus topology, master-slave topology, multi-drop topology, or the like. One or more wire connections of wire bonding 804 can communicatively connect one or more dies of first part 801 with one or more dies of second part 802.

Optionally, PIM architecture 800 can also include an interlayer 803 between first part 801 and second part 802. In some embodiments, interlayer 803 can be formed by insulating material to insulate first part 801 from second part 802. Interlayer 803 can also include metal connections therein, such as TSVs, traces, or the like. In some embodiments, interlayer 803 can include an adhesive material, such as polymer, to bond first part 801 with second part 802.

In some embodiments, PIM architecture 800 can include more parts, such as a third part, a fourth part, . . . , etc. These parts can be integrated one upon another. PIM device can also include a plurality of wire bondings. Each wire bonding can communicatively connect two or more parts and support communication therebetween.

In some embodiments, a computer program product may include a non-transitory computer-readable storage medium having computer-readable program instructions thereon for causing one or more processors to carry out the above-described methods. For example, one or more processors of a computing system can execute the computer-readable program instructions to compile instructions for causing the above-described memory devices to implement the above-described methods.

The computer-readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object-oriented programming language, and conventional procedural programming languages. The computer readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to one or more processors of a computer, or other programmable data processing apparatus to produce a machine, such that the instructions, which execute via the one or more processors of the computer or other programmable data processing apparatus, create means for implementing the above-described methods.

The flow charts and diagrams in the figures illustrate the architecture, functionality, and operation of possible implementations of devices, methods, and computing program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

The embodiments may further be described using the following clauses:

1. A memory system for allocating memory space, comprising:
    a memory device for providing the memory space;
    a memory controller component communicatively coupled with the memory device; and
    a compiler component configured for:
    receiving a request for allocating a data array having a plurality of data elements in the memory device, wherein each of the plurality of data elements has a logical address;
    generating an instruction for causing the memory controller component to allocate memory space for the data array in the memory device based on the request;
    generating device addresses for the plurality of data elements in the memory device based on logical addresses of the plurality of data elements; and
    causing the memory controller component to allocate the memory space for the data array in the memory device based on the device addresses and the instruction.

2. The memory system according to clause 1, wherein in generating the device addresses for the plurality of data elements in the memory device based on the logical addresses of the plurality of data elements, the compiler component is further configured for:

determining an access trace of the logical addresses of the plurality of data elements based on the request;

grouping the plurality of data elements into a plurality of data groups based on the access trace, wherein data elements of each data group have continuous logical addresses according to the access trace;

mapping the plurality of data groups to available rows of memory banks of the memory device; and determining device addresses of the available rows as the device addresses for the plurality of data elements in the memory device.

3. The memory system according to clause 2, wherein in determining the access trace of the logical addresses of the plurality of data elements, the compiler component is further configured for:

transforming the request to one or more loops associated with the plurality of data elements;

determining a loop trace of the one or more loops; and determining the access trace of the logical addresses of the plurality of data elements based on the loop trace.

4. The memory system according clause 2 or 3, wherein the compiler component is further configured for:

reordering the plurality of data groups according to the access trace, wherein the data array is associated with a variable related to mapping the plurality of data groups.

5. The memory system according to clause 4, wherein in response to the variable meeting a first condition, in mapping the plurality of data groups to available rows of the memory banks of the memory device, the compiler component is further configured for:

determining available space of the memory banks of the memory device;

sorting the memory banks of the memory device based on a descending order of the available space of the memory banks; and sequentially mapping the plurality of data groups to the available rows of the memory banks according to the descending order.

6. The memory system according to clause 4 or 5, wherein in response to the variable meeting a second condition, in mapping the plurality of data groups to available rows of the memory banks of the memory device, the compiler component is further configured for:

determining available space of the memory banks of the memory device;

selecting a first number of memory banks having the largest available space; and distributing the plurality of data groups to the first number of memory banks according to a bank stride and a data stride in an interleaving manner.

7. The memory system according to any one of clauses 4-6, further comprising a tuner component configured for:

providing one or more tuning parameter sets to the compiler component, each parameter set having a plurality of tuning parameters, wherein the plurality of tuning parameters comprise the variable, the first number, the bank stride, and the data stride;

evaluating performance of the memory device under each of the plurality of tuning parameter sets; and determining, among the one or more tuning parameter sets, a tuning parameter set for allocating memory space in the memory device based on the evaluation.

8. The memory system according to clause 6 or 7, wherein the bank stride is equal to a second number and the data stride is equal to a third number, and in distributing the plurality of data groups to the first number of memory banks according to the bank stride and the data stride, the compiler component is further configured for:

distributing to, a first memory bank having the largest available space, a first batch having the third number of data groups;

determining, among the first number of memory banks, a second memory bank based on the first number and the second number;

distributing, to the second memory bank, a second batch having another third number of data groups, wherein the second batch is neighboring to the first batch in the plurality of data groups.

9. The memory system according clause 7 or 8, wherein the plurality of tuning parameters further comprise a hardware configuration.

10. The memory system according to any one of clauses 1-9, wherein in generating the device addresses for the plurality of data elements in the memory device based on logical addresses of the plurality of data elements, the compiler component is further configured for:

generating physical addresses of the plurality of data elements based on the logical addresses; and generating the device addresses for the plurality of data elements in the memory device based on the physical addresses.

11. A method for allocating memory space in a memory device, comprising:

receiving a request for allocating a data array having a plurality of data elements in the memory device, wherein each of the plurality of data elements has a logical address;

generating an instruction for allocating memory space for the data array in the memory device based on the request;

generating device addresses for the plurality of data elements in the memory device based on logical addresses of the plurality of data elements; and allocating the memory space for the data array in the memory device based on the device addresses and the instruction.

12. The method according to clause 11, wherein generating the device addresses for the plurality of data elements in the memory device based on the logical addresses of the plurality of data elements further comprises:

determining an access trace of the logical addresses of the plurality of data elements based on the request;

grouping the plurality of data elements into a plurality of data groups based on the access trace, wherein data elements of each data group have continuous logical addresses according to the access trace;

mapping the plurality of data groups to available rows of memory banks of the memory device; and determining device addresses of the available rows as the device addresses for the plurality of data elements in the memory device.

13. The method according to clause 12, wherein determining the access trace of the logical addresses of the plurality of data elements further comprises:

transforming the request to one or more loops associated with the plurality of data elements;

determining a loop trace of the one or more loops; and determining the access trace of the logical addresses of the plurality of data elements based on the loop trace.

14. The method according clause 12 or 13, further comprising:

reordering the plurality of data groups according to the access trace, wherein the data array is associated with a variable related to mapping the plurality of data groups.

15. The method according to clause 14, wherein in response to the variable meeting a first condition, mapping the plurality of data groups to available rows of the memory banks of the memory device further comprises:

determining available space of the memory banks of the memory device;

sorting the memory banks of the memory device based on a descending order of the available space of the memory banks; and sequentially mapping the plurality of data groups to the available rows of the memory banks according to the descending order.

16. The method according to clause 14 or 15, wherein in response to the variable meeting a second condition, mapping the plurality of data groups to available rows of the memory banks of the memory device further comprises:

determining available space of the memory banks of the memory device;

selecting a first number of memory banks having the largest available space; and distributing the plurality of data groups to the first number of memory banks according to a bank stride and a data stride in an interleaving manner.

17. The method according to any one of clauses 14-16, further comprising:

providing one or more tuning parameter sets, each parameter set having a plurality of tuning parameters, wherein the plurality of tuning parameters comprise the variable, the first number, the bank stride, and the data stride;

evaluating performance of the memory device under each of the plurality of tuning parameter sets; and determining, among the one or more tuning parameter sets, a tuning parameter set for allocating memory space in the memory device based on the evaluation.

18. The method according clause 16 or 17, wherein the bank stride is equal to a second number and the data stride is equal to a third number, and distributing the plurality of data groups to the first number of memory banks according to the bank stride and the data stride further comprises:

distributing to, a first memory bank having the largest available space, a first batch having the third number of data groups;

determining, among the first number of memory banks, a second memory bank based on the first number and the second number;

distributing, to the second memory bank, a second batch having another third number of data groups, wherein the second batch is neighboring to the first batch in the plurality of data groups.

19. The method according clause 17 or 18, wherein the plurality of tuning parameters further comprise a hardware configuration.

20. The method according to any one of clauses 11-19, wherein generating the device addresses for the plurality of data elements in the memory device based on logical addresses of the plurality of data elements further comprises:

generating physical addresses of the plurality of data elements based on the logical addresses; and generating the device addresses for the plurality of data elements in the memory device based on the physical addresses.

21. A memory system for allocating memory space, comprising:

a memory storing a set of instructions; and one or more processors configured to execute the set of instructions to cause the system to perform:

receiving a request for allocating a data array having a plurality of data elements in the memory device, wherein each of the plurality of data elements has a logical address;

generating an instruction for allocating memory space for the data array in the memory device based on the request;

generating device addresses for the plurality of data elements in the memory device based on logical addresses of the plurality of data elements; and allocating the memory space for the data array in the memory device based on the device addresses and the instruction.

22. The system according to clause 21, wherein in generating the device addresses for the plurality of data elements in the memory device based on the logical addresses of the plurality of data elements, the one or more processors are further configured to execute the set of instructions to cause the system to perform:

determining an access trace of the logical addresses of the plurality of data elements based on the request;

grouping the plurality of data elements into a plurality of data groups based on the access trace, wherein data elements of each group have continuous logical addresses according to the access trace;

mapping the plurality of data groups to available rows of memory banks of the memory device; and determining device addresses of the available rows as the device addresses for the plurality of data elements in the memory device.

23. The system according to clause 22, wherein in determining the access trace of the logical addresses of the plurality of data elements, the one or more processors are further configured to execute the set of instructions to cause the system to perform:

transforming the request to one or more loops associated with the plurality of data elements;

determining a loop trace of the one or more loops; and determining the access trace of the logical addresses of the plurality of data elements based on the loop trace.

24. The system according clause 22 or 23, wherein the one or more processors are further configured to execute the set of instructions to cause the system to perform:

reordering the plurality of data groups according the access trace, wherein the data array is associated with a variable related to mapping the plurality of data groups.

25. The system according to clause 24, wherein when the variable meets a first condition, in mapping the plurality of data groups to available rows of the memory banks of the memory device, the one or more processors are further configured to execute the set of instructions to cause the system to perform:

determining available space of the memory banks of the memory device;

sorting the memory banks of the memory device based on a descending order of the available space of the memory banks; and sequentially mapping the plurality of data groups to the available rows of the memory banks according to the descending order.

26. The system according to clause 24 or 25, wherein when the variable meeting a second condition, in mapping the plurality of data groups to available rows of the memory banks of the memory device, the one or more processors are further configured to execute the set of instructions to cause the system to perform:

determining available space of the memory banks of the memory device;

selecting a first number of memory banks having the largest available space; and distributing the plurality of data groups to the first number of memory banks according to a bank stride and a data stride in an interleaving manner.

27. The system according to any one of clauses 24-26, wherein the one or more processors are further configured to execute the set of instructions to cause the system to perform:

providing one or more tuning parameter sets, each having a plurality of tuning parameters, wherein the plurality of tuning parameters comprise the variable, the first number, the bank stride, and the data stride;

evaluating performance of the memory device under each of the plurality of tuning parameter sets; and determining, among the one or more tuning parameter sets, a tuning parameter set for allocating memory space in the memory device based on the evaluation.

28. The system according clause 26 or 27, wherein the bank stride is equal to a second number and the data stride is equal to a third number, and in distributing the plurality of data groups to the first number of memory banks according to the bank stride and the data stride, the one or more processors are further configured to execute the set of instructions to cause the system to perform:

distributing to, a first memory bank having the largest available space, a first batch having the third number of data groups;

determining, among the first number of memory banks, a second memory bank based on the first number and the second number;

distributing to, the second memory bank, a second batch having another third number of data groups, wherein the second batch is neighboring to the first batch in the plurality of data groups.

29. The system according clause 27 or 28, wherein the plurality of tuning parameters further comprise a hardware configuration.

30. The system according to any one of clauses 21-29, wherein in generating the device addresses for the plurality of data elements in the memory device based on logical addresses of the plurality of data elements, the one or more processors are further configured to execute the set of instructions to cause the system to perform:

generating physical addresses of the plurality of data elements based on the logical addresses; and generating the device addresses for the plurality of data elements in the memory device based on the physical addresses.

31. A processing-in-memory architecture, comprising:

a first part storing a set of instructions; and a second part configured to execute the set of instructions to cause the architecture to perform:

receiving a request for allocating a data array having a plurality of data elements in the memory device, wherein each of the plurality of data elements has a logical address;

generating an instruction for allocating memory space for the data array in the memory device based on the request;

generating device addresses for the plurality of data elements in the memory device based on logical addresses of the plurality of data elements; and allocating the memory space for the data array in the memory device based on the device addresses and the instruction.

32. A non-transitory computer readable medium that stores a set of instructions that is executable by one or more processors of a memory system to cause the memory system to perform a method for allocating memory space in a memory device of the memory system, comprising:

receiving a request for allocating a data array having a plurality of data elements in the memory device, wherein each of the plurality of data elements has a logical address;

generating an instruction for allocating memory space for the data array in the memory device based on the request;

generating device addresses for the plurality of data elements in the memory device based on logical addresses of the plurality of data elements; and allocating the memory space for the data array in the memory device based on the device addresses and the instruction.

As used herein, the terms "comprises," "comprising," or any other variation thereof are intended to cover a non-exclusive inclusion, such that a process, method, composition, article, or apparatus that comprises a list of elements does not include only those elements but may include other elements not expressly listed or inherent to such process, method, composition, article, or apparatus. The term "exemplary" is used in the sense of "example" rather than "ideal."

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

What is claimed is:

1. A memory system for allocating memory space, comprising:

a memory device for providing the memory space; and a compiler component configured for:

receiving a request for allocating a data array having a plurality of data elements in the memory device, wherein each of the plurality of data elements has a logical address;

generating an instruction for allocating memory space for the data array in the memory device based on the request;

generating device addresses for the plurality of data elements in the memory device based on logical addresses of the plurality of data elements, comprises:

determining an access trace of the logical addresses of the plurality of data elements based on the request;

reordering the plurality of data groups according to the access trace, wherein the data array is associated with a variable related to mapping the plurality of data groups;

grouping the plurality of data elements into a plurality of data groups based on the access trace, wherein data elements of each data group have continuous logical addresses according to the access trace;

mapping the plurality of data groups to available rows of memory banks of the memory device; and determining device addresses of the available rows as the device addresses for the plurality of data elements in the memory device; and allocating the memory space for the data array in the memory device based on the device addresses and the instruction.

2. The memory system according to claim 1, wherein in determining the access trace of the logical addresses of the plurality of data elements, the compiler component is further configured for:
   transforming the request to one or more loops associated with the plurality of data elements;
   determining a loop trace of the one or more loops; and
   determining the access trace of the logical addresses of the plurality of data elements based on the loop trace.

3. The memory system according to claim 1, wherein in response to the variable meeting a first condition, in mapping the plurality of data groups to available rows of the memory banks of the memory device, the compiler component is further configured for:
   determining available space of the memory banks of the memory device;
   sorting the memory banks of the memory device based on a descending order of the spaciousness of the memory banks; and
   sequentially mapping the plurality of data groups to the available rows of the memory banks according to the descending order.

4. The memory system according to claim 1, wherein in response to the variable meeting a second condition, in mapping the plurality of data groups to available rows of the memory banks of the memory device, the compiler component is further configured for:
   determining available space of the memory banks of the memory device;
   selecting a first number of memory banks having the largest available space; and
   distributing the plurality of data groups to the first number of memory banks according to a bank stride and a data stride in an interleaving manner.

5. The memory system according to claim 1, further comprising a tuner component configured for:
   providing one or more tuning parameter sets to the compiler component, each parameter set having a plurality of tuning parameters, wherein the plurality of tuning parameters comprise the variable, the first number, the bank stride, and the data stride;
   evaluating performance of the memory device under each of the plurality of tuning parameter sets; and
   determining, among the one or more tuning parameter sets, a tuning parameter set for allocating memory space in the memory device based on the evaluation.

6. The memory system according claim 4, wherein the bank stride is equal to a second number and the data stride is equal to a third number, and in distributing the plurality of data groups to the first number of memory banks according to the bank stride and the data stride, the compiler component is further configured for:
   distributing to, a first memory bank having the largest available space, a first batch having the third number of data groups;
   determining, among the first number of memory banks, a second memory bank based on the first number and the second number;
   distributing, to the second memory bank, a second batch having another third number of data groups, wherein the second batch is neighboring to the first batch in the plurality of data groups.

7. The memory system according claim 5, wherein the plurality of tuning parameters further comprise a hardware configuration.

8. The memory system according to claim 1, wherein in generating the device addresses for the plurality of data elements in the memory device based on logical addresses of the plurality of data elements, the compiler component is further configured for:
   generating physical addresses of the plurality of data elements based on the logical addresses; and
   generating the device addresses for the plurality of data elements in the memory device based on the physical addresses.

9. A method for allocating memory space in a memory device, comprising:
   receiving a request for allocating a data array having a plurality of data elements in the memory device, wherein each of the plurality of data elements has a logical address;
   generating an instruction for allocating memory space for the data array in the memory device based on the request;
   generating device addresses for the plurality of data elements in the memory device based on logical addresses of the plurality of data elements, comprises:
     determining an access trace of the logical addresses of the plurality of data elements based on the request;
     reordering the plurality of data groups according to the access trace, wherein the data array is associated with a variable related to mapping the plurality of data groups;
     grouping the plurality of data elements into a plurality of data groups based on the access trace, wherein data elements of each data group have continuous logical addresses according to the access trace;
     mapping the plurality of data groups to available rows of memory banks of the memory device; and
     determining device addresses of the available rows as the device addresses for the plurality of data elements in the memory device; and
   allocating the memory space for the data array in the memory device based on the device addresses and the instruction.

10. The method according to claim 9, wherein determining the access trace of the logical addresses of the plurality of data elements further comprises:
    transforming the request to one or more loops associated with the plurality of data elements;
    determining a loop trace of the one or more loops; and
    determining the access trace of the logical addresses of the plurality of data elements based on the loop trace.

11. The method according to claim 9, wherein in response to the variable meeting a first condition, mapping the plurality of data groups to available rows of the memory banks of the memory device further comprises:
    determining available space of the memory banks of the memory device;
    sorting the memory banks of the memory device based on a descending order of the available space of the memory banks; and
    sequentially mapping the plurality of data groups to the available rows of the memory banks according to the descending order.

12. The method according to claim 9, wherein in response to the variable meeting a second condition, mapping the plurality of data groups to available rows of the memory banks of the memory device further comprises:

determining available space of the memory banks of the memory device;
selecting a first number of memory banks having the largest available space; and
distributing the plurality of data groups to the first number of memory banks according to a bank stride and a data stride in an interleaving manner.

13. The method according to claim 9, further comprising:
providing one or more tuning parameter sets, each parameter set having a plurality of tuning parameters, wherein the plurality of tuning parameters comprise the variable, the first number, the bank stride, and the data stride;
evaluating performance of the memory device under each of the plurality of tuning parameter sets; and
determining, among the one or more tuning parameter sets, a tuning parameter set for allocating memory space in the memory device based on the evaluation.

14. The method according claim 12, wherein the bank stride is equal to a second number and the data stride is equal to a third number, and distributing the plurality of data groups to the first number of memory banks according to the bank stride and the data stride further comprises:
distributing to, a first memory bank having the largest available space, a first batch having the third number of data groups;
determining, among the first number of memory banks, a second memory bank based on the first number and the second number;
distributing, to the second memory bank, a second batch having another third number of data groups, wherein the second batch is neighboring to the first batch in the plurality of data groups.

15. The method according claim 13, wherein the plurality of tuning parameters further comprise a hardware configuration.

16. The method according to claim 9, wherein generating the device addresses for the plurality of data elements in the memory device based on logical addresses of the plurality of data elements further comprises:
generating physical addresses of the plurality of data elements based on the logical addresses; and
generating the device addresses for the plurality of data elements in the memory device based on the physical addresses.

17. A memory system for allocating memory space, comprising:
a memory storing a set of instructions; and
one or more processors configured to execute the set of instructions to cause the system to perform:
receiving a request for allocating a data array having a plurality of data elements in the memory, wherein each of the plurality of data elements has a logical address;
generating an instruction for allocating memory space for the data array in the memory device based on the request;
generating device addresses for the plurality of data elements in the memory device based on logical addresses of the plurality of data elements, comprises:
determining an access trace of the logical addresses of the plurality of data elements based on the request;
reordering the plurality of data groups according to the access trace, wherein the data array is associated with a variable related to mapping the plurality of data groups;
grouping the plurality of data elements into a plurality of data groups based on the access trace, wherein data elements of each data group have continuous logical addresses according to the access trace;
mapping the plurality of data groups to available rows of memory banks of the memory device; and
determining device addresses of the available rows as the device addresses for the plurality of data elements in the memory device; and
allocating the memory space for the data array in the memory device based on the device addresses and the instruction.

18. The memory system according to claim 17, wherein in determining the access trace of the logical addresses of the plurality of data elements, the one or more processors are further configured to execute the set of instructions to cause the system to perform:
transforming the request to one or more loops associated with the plurality of data elements;
determining a loop trace of the one or more loops; and
determining the access trace of the logical addresses of the plurality of data elements based on the loop trace.

19. The memory system according to claim 17, wherein when the variable meets a first condition, in mapping the plurality of data groups to available rows of the memory banks of the memory device, the one or more processors are further configured to execute the set of instructions to cause the system to perform:
determining available space of the memory banks of the memory device;
sorting the memory banks of the memory device based on a descending order of the available space of the memory banks; and
sequentially mapping the plurality of data groups to the available rows of the memory banks according to the descending order.

20. The memory system according to claim 17, wherein when the variable meeting a second condition, in mapping the plurality of data groups to available rows of the memory banks of the memory device, the one or more processors are further configured to execute the set of instructions to cause the system to perform:
determining available space of the memory banks of the memory device;
selecting a first number of memory banks having the largest available space; and
distributing the plurality of data groups to the first number of memory banks according to a bank stride and a data stride in an interleaving manner.

21. The memory system according to claim 17, wherein the one or more processors are further configured to execute the set of instructions to cause the system to perform:
providing one or more tuning parameter sets, each having a plurality of tuning parameters, wherein the plurality of tuning parameters comprise the variable, the first number, the bank stride, and the data stride;
evaluating performance of the memory device under each of the plurality of tuning parameter sets; and
determining, among the one or more tuning parameter sets, a tuning parameter set for allocating memory space in the memory device based on the evaluation.

22. The memory system according claim 20, wherein the bank stride is equal to a second number and the data stride is equal to a third number, and in distributing the plurality of data groups to the first number of memory banks according to the bank stride and the data stride, the one or more processors are further configured to execute the set of instructions to cause the system to perform:
    distributing to, a first memory bank having the largest available space, a first batch having the third number of data groups;
    determining, among the first number of memory banks, a second memory bank based on the first number and the second number;
    distributing to, the second memory bank, a second batch having another third number of data groups, wherein the second batch is neighboring to the first batch in the plurality of data groups.

23. The memory system according claim 21, wherein the plurality of tuning parameters further comprise a hardware configuration.

24. The memory system according to claim 17, wherein in generating the device addresses for the plurality of data elements in the memory device based on logical addresses of the plurality of data elements, the one or more processors are further configured to execute the set of instructions to cause the system to perform:
    generating physical addresses of the plurality of data elements based on the logical addresses; and
    generating the device addresses for the plurality of data elements in the memory device based on the physical addresses.

25. A processing-in-memory architecture, comprising:
a first part storing a set of instructions; and
a second part configured to execute the set of instructions to cause the architecture to perform:
    receiving a request for allocating a data array having a plurality of data elements in the memory device, wherein each of the plurality of data elements has a logical address;
    generating an instruction for allocating memory space for the data array in the memory device based on the request;
    generating device addresses for the plurality of data elements in the memory device based on logical addresses of the plurality of data elements, comprises:
        determining an access trace of the logical addresses of the plurality of data elements based on the request;
        reordering the plurality of data groups according to the access trace, wherein the data array is associated with a variable related to mapping the plurality of data groups;
        grouping the plurality of data elements into a plurality of data groups based on the access trace, wherein data elements of each data group have continuous logical addresses according to the access trace;
        mapping the plurality of data groups to available rows of memory banks of the memory device; and
        determining device addresses of the available rows as the device addresses for the plurality of data elements in the memory device; and
    allocating the memory space for the data array in the memory device based on the device addresses and the instruction.

26. A non-transitory computer readable medium that stores a set of instructions that is executable by one or more processors of a memory system to cause the memory system to perform a method for allocating memory space in a memory device of the memory system, comprising:
    receiving a request for allocating a data array having a plurality of data elements in the memory device, wherein each of the plurality of data elements has a logical address;
    generating an instruction for allocating memory space for the data array in the memory device based on the request;
    generating device addresses for the plurality of data elements in the memory device based on logical addresses of the plurality of data elements, comprising:
        determining an access trace of the logical addresses of the plurality of data elements based on the request;
        reordering the plurality of data groups according to the access trace, wherein the data array is associated with a variable related to mapping the plurality of data groups;
        grouping the plurality of data elements into a plurality of data groups based on the access trace, wherein data elements of each data group have continuous logical addresses according to the access trace;
        mapping the plurality of data groups to available rows of memory banks of the memory device; and
        determining device addresses of the available rows as the device addresses for the plurality of data elements in the memory device; and
    allocating the memory space for the data array in the memory device based on the device addresses and the instruction.

\* \* \* \* \*